US006928545B1

(12) United States Patent
Litai et al.

(10) Patent No.: US 6,928,545 B1
(45) Date of Patent: Aug. 9, 2005

(54) NETWORK CONTENT ACCESS CONTROL

(75) Inventors: Assaf Litai, Kfar Saba (IL); Ariel Peled, Even Yehuda (IL)

(73) Assignee: Vidius Inc., Beverly Hills, CA (US)

( * ) Notice: Subject to any disclaimer, the term of this patent is extended or adjusted under 35 U.S.C. 154(b) by 0 days.

(21) Appl. No.: 09/546,384

(22) Filed: Apr. 10, 2000

(30) Foreign Application Priority Data

Apr. 9, 2000 (IL) .................................. 135555

(51) Int. Cl.[7] ............................................. H04L 9/00
(52) U.S. Cl. .................. 713/185; 713/184; 713/183; 713/201
(58) Field of Search ............................... 713/183, 185, 713/200, 182, 184

(56) References Cited

U.S. PATENT DOCUMENTS

| | | | | |
|---|---|---|---|---|
| 5,491,752 A | * | 2/1996 | Kaufman et al. | 380/30 |
| 5,535,276 A | * | 7/1996 | Ganesan | 713/155 |
| 5,590,199 A | * | 12/1996 | Krajewski et al. | 713/159 |
| 5,754,763 A | * | 5/1998 | Bereiter | 713/201 |
| 5,809,144 A | * | 9/1998 | Sirbu et al. | 705/53 |
| 5,923,756 A | * | 7/1999 | Shambroom | 713/156 |
| 6,026,414 A | * | 2/2000 | Anglin | 707/204 |

OTHER PUBLICATIONS

Alfred J. Menezes et al., Handbook of Applied Cryptography, 1997, CRC Press LLC, pp. 401-403, 500-502.*

* cited by examiner

Primary Examiner—Norman M. Wright
(74) Attorney, Agent, or Firm—G.E Ehrlich (1995) Ltd.

(57) ABSTRACT

A method for preventing unauthorized access by a requestor to data sent via computer networks, including a) requesting, from a requesting computer, access to data from a first server, at the first server b) determining if the request is a valid request, c) receiving a ticket from a ticket server, if the request is a valid request d) providing the ticket identifying the requestor to a second server the data is stored, e) directing the requesting computer to request access to the data from the second server, at the second server f) receiving the request from the requesting computer, g) verifying the ticket as identifying the requestor, and h) sending the data to the requesting computer in response to the request.

17 Claims, 4 Drawing Sheets

NETWORK CONTENT ACCESS CONTROL

FIELD OF THE INVENTION

The present invention relates to computer network communications in general, and more particularly to preventing unauthorized access to data sent via computer networks.

BACKGROUND OF THE INVENTION

Methods for controlling access to data via computer networks are well known. Some methods require that IDs and passwords be provided to the data server in order to gain access to data. In other methods a data server provides encrypted data to the client, where the data is then decrypted using a key and decryption software previously provided to the client. In other methods digital watermarks are embedded into the data at the data source allowing for distribution of the data to be monitored for unauthorized distribution.

These and other prior art approaches are suited for peer-to-peer architectures where the data resides at a single source, such as on one or more servers under the direct control of the data owner, and the data is provided directly from the data holder's server to the requesting client. Such peer-to-peer arrangements are currently in wide use on the Internet, and represents the most common default arrangement.

Providing high-bandwidth content via computer networks, however, places a considerable load on peer-to-peer architectures. As a result proxy servers are often used to "mirror" data stored at the data owner's server and provide data to clients. Unfortunately, these proxy servers are often not under the direct control of the data owner, and steps taken by the data owner at the original data source to protect unauthorized access to data are often not taken by the proxy servers, leading to unauthorized access.

SUMMARY OF THE INVENTION

The present invention seeks to provide a system for preventing unauthorized access to data sent via computer networks that overcome disadvantages of the prior art.

There is thus provided in accordance with a preferred embodiment of the present invention a method for preventing unauthorized access by a requester to data sent via computer networks, including a) requesting, from a requesting computer, access to data from a first server, at the first server b) determining if the request is a valid request, c) receiving a ticket from a ticket server, if the request is a valid request d) providing the ticket identifying the requestor to a second server the data is stored, e) directing the requesting computer to request access to the data from the second server, at the second server f) receiving the request from the requesting computer, g) verifying the ticket as identifying the requestor, and h) sending the data to the requesting computer in response to the request.

Further in accordance with a preferred embodiment of the present invention the requesting computer is a client computer.

Still further in accordance with a preferred embodiment of the present invention the second server is either of a proxy server and a cache server.

Additionally in accordance with a preferred embodiment of the present invention the data is encrypted and the providing step d) further includes the first server providing a decryption key to the second server for decrypting the data.

Moreover in accordance with a preferred embodiment of the present invention the data is encrypted and the providing step d) further includes the ticket server providing a decryption key to the second server for decrypting the data.

Further in accordance with a preferred embodiment of the present invention the providing step d) further includes providing the ticket to the second server by way of the client computer.

Still further in accordance with a preferred embodiment of the present invention the method further includes the client computer locating the second server using a search engine.

Additionally in accordance with a preferred embodiment of the present invention the verifying step g) further includes i) sending the ticket to the ticket server for validation, and j) receiving a communication from the ticket server validating the ticket.

Moreover in accordance with a preferred embodiment of the present invention the sending step h) further includes embedding a marking into the data prior to sending the data to the client computer.

Further in accordance with a preferred embodiment of the present invention the marking is a digital watermark.

Still further in accordance with a preferred embodiment of the present invention the marking is a personalized marking for the requestor.

There is also provided in accordance with a preferred embodiment of the present invention a method for preventing unauthorized transfer of data sent via computer networks, the method including the steps of impacting a first server to send content to a second server, notifying a ticket server of the instructions, validating the instructions at the ticket server, if the instructions are valid notifying either of the servers that the instructions are valid, sending the content from the first server to the second server, if the instructions are invalid notifying either of the servers that the instructions are invalid, performing any of ignoring the instructions, corrupting the content, and discarding the content.

Further in accordance with a preferred embodiment of the present invention the method further includes the steps of embedding a marking into the data, checking the validity of the marking at either of the servers, and if the marking is invalid, performing any of ignoring the instructions, corrupting the content, and discarding the content.

Still further in accordance with a preferred embodiment of the present invention the validating step includes validating the instructions in accordance with a policy.

Additionally in accordance with a preferred embodiment of file present invention the embedding step includes embedding any of an identification unique to the first server, an identification unique to the second server, routing information, and rule-based information.

Moreover in accordance with a preferred embodiment of the present invention the method further includes the first server receiving an encryption key from the ticket server, and encrypting the content using the encryption key.

Further in accordance with a preferred embodiment of the present invention the method further includes the second server receiving a decryption key from either of the first server and the ticket server, and decrypting the content using the decryption key.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
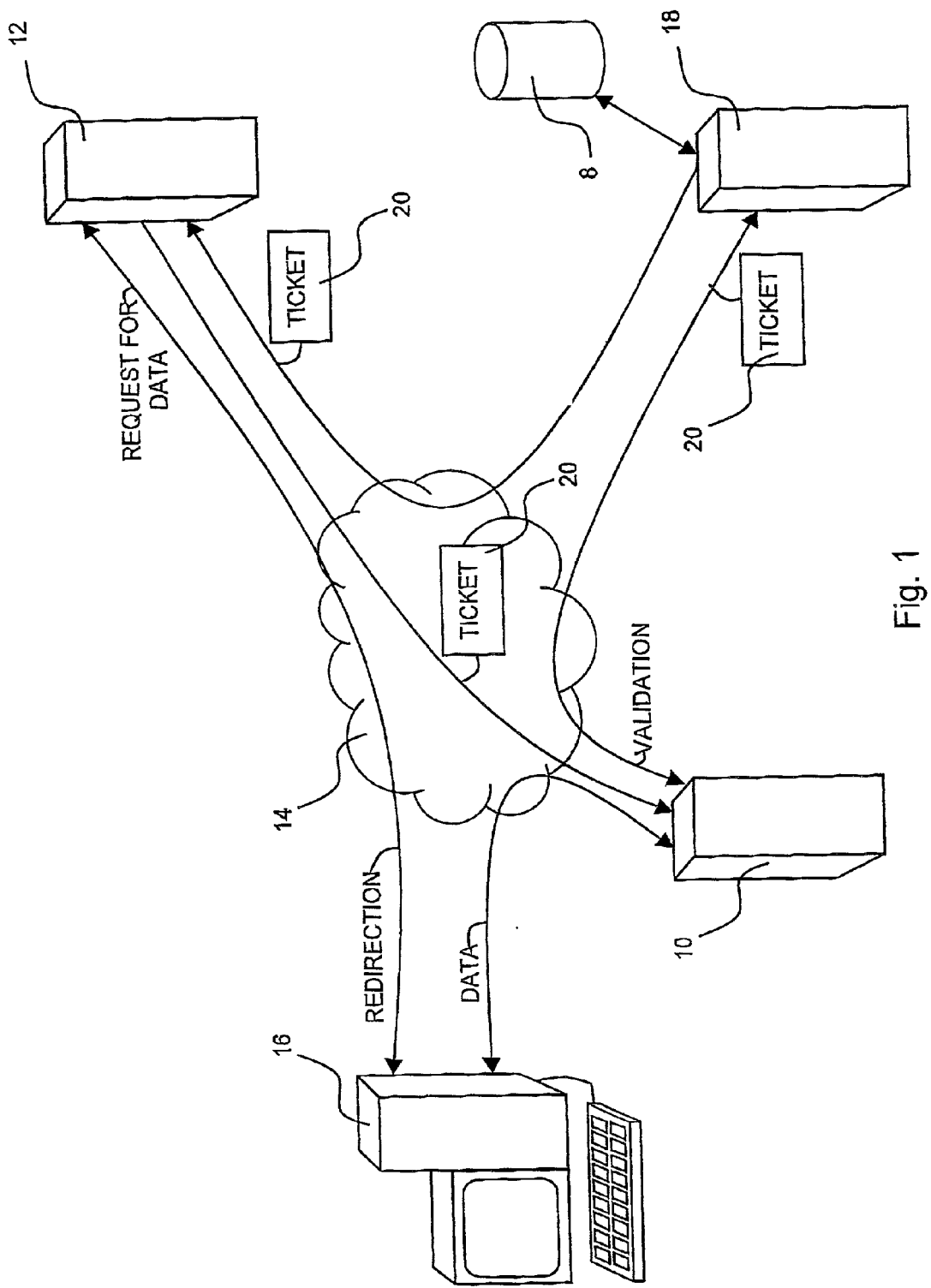
FIG. 1 which is a simplified conceptual illustration of a system for preventing unauthorized access to data sent via computer networks, constructed and operative in accordance with a preferred embodiment of the present invention.

Reference is now made to FIG. 1 which is a simplified conceptual illustration of a system for preventing unauthorized access to data sent via computer networks, constructed and operative in accordance with a preferred embodiment of the present invention. In the system of FIG. 1, data, such as text-based or numeric data, graphical data, audio data, or any other kind or combination of data that may be transmitted via a computer network, is stored on a server 10, such as a proxy or cache server, typically provided to server 10 by a data source server 12, such as via a computer network 14, such as the Internet. Preferably, the data provided by server 12 to server 10 is encrypted using any conventional encryption technique.

A ticket server 18 provides data "tickets" 20 to server 12, such as via network 14, where each ticket includes an identifier that is preferably unique to all other tickets provided to server 12 and/or all other tickets provided by server 18 to any other server, and that is preferably encrypted using any conventional encryption technique. Tickets 20 may be provided to server 12 in response to a request sent by server 12 to server 18 for tickets, such as upon server 12 receiving a request from a user at a client computer 16 who wishes to access the data stored on server 10, and/or ray be provided not in connection with any such request, such as for future use by server 12. Client computer 16 may be any network-connectable computer or appliance, such as a personal computer, a personal digital assistant, a cellular telephone, and a web-enabled television appliance.

Figure 2:
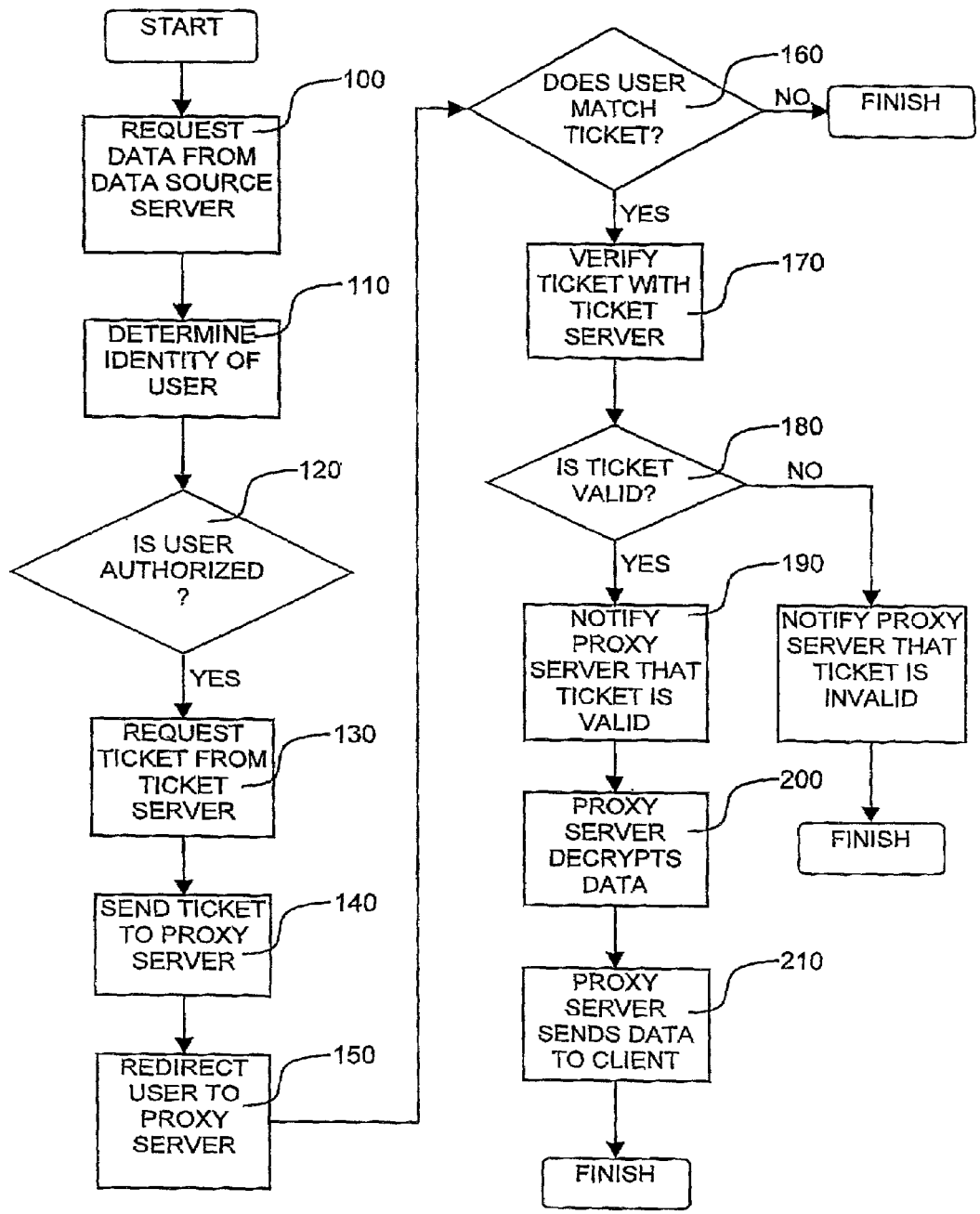
FIG. 2 is a simplified flowchart illustration of a method of operation of the system of FIG. 1, the method being operative in accordance with a preferred embodiment of the present invention.

A typical operational scenario of the system of FIG. 1 may be seen with additional reference to FIG. 2, which is a simplified flowchart illustration of a method operative in accordance with a preferred embodiment of the present invention. In the method of FIG. 2 a user at client computer 16 who wishes to access the data stored on server 10 sends a request to server 12 to access the data, such as via network 14 (step 100). Server 12 identifies the user using any conventional technique, such as by a user identifier sent with the request or by the source address of the request being previously known to server 10 (step 110), and determines whether the user is authorized to access the data (step 120). This authorization process may include checking the user's current credit status or account balance or any other know authorization criteria (or other methods in use today). If the user is authorized to access the data, server 12 requests a ticket from ticket server 18 (step 130). Alternatively or additionally, server 12 may request or otherwise receive one or more tickets prior to receiving requests from clients. The ticket, preferably encrypted, is sent by server 12 to server 10 together with a user and/or client computer identifier identifying the requester and preferably a decryption key, where the data at server 10 is encrypted (step 140). Alternatively, the key may be provided to server 10 by ticket server 18 as part of the verification process (see step 180 below). Client 16 is then directed to server 10, typically by server 12, which client 16 then contacts (step 150). Alternatively, server 10 or another server on client 16's request route may intercept the client 16's request and redirect client 16 to server 10. Yet another possibility is where client 16 receives ticket 20 from server 12 and searches for the most suitable server, in terms of distance, load and other parameters, where the desired data may be found. In this case, once client 16 locates an appropriate server 10 it sends ticket 20 to server 10 which validates it with server 18 and transmits the content to client 16.

Upon being contacted by client 16, server 10 identifies the requesting user using any conventional technique, such as by a user identifier sent with the request or by the source address of the request being previously known to server 10, and searches for a ticket bearing the user's identity (step 160). Server 10 then sends information from the ticket, such as the ticket identifier and/or the user identifier, or the entire ticket 20 to ticket server 18 for verification (step 170). Ticket server 18 then verifies the ticket (step 180), preferably taking steps that the ticket either be cancelled or removed from the ticket pool (such as in the case where client 16's access to the data is limited) or allowed to remain at ticket server 18 (such as where client 16's access to the data is unlimited). Ticket server 18 then notifies server 10 that the ticket is valid (step 190). Server 10 then decrypts the data if required using the decryption key received with the ticket (step 200), and sends the data to the user at client 16 (step 210). Optionally, server 10 may, using conventional techniques, embed a digital watermark or any other type of known marking into the data before it is sent to client 16. The embedded marking may be sent to server 10 as part of ticket 20. The digital watermark may be personalized for the specific user. Server 10 may also encrypt the data before it is sent to client 16, with the decryption key having been previously sent to client 16 by server 12 as part of the redirect message or otherwise.

Alternatively to step 140, server 12 may send the ticket to client 16 in addition to or instead of sending the ticket to server 10. Where the ticket is sent to client 16, client 16 provides the ticket to server 10 which then verifies the ticket with ticket server 18 as described hereinabove. Where server 12 does not provide redirection information to client 16, server 12 may provide other information to client 16, such as keywords identifying server 10, that client 16 may then use to search for server 10 (which has the required content) using conventional techniques, such as by using publicly-available search engines.

Verification step 180 may include determining the validity of the ticket in accordance with a policy table 8 which typically includes distribution parameters preferably specified by the content owner. Examples of such distribution parameters may include approved times for providing content, approved sources of specific content, types of end-point protection schemes required (such as Microsoft Digital Rights Management, Intertrust DigiBox, etc.), as well as a list of unauthorized set-top boxes, and users. Examples of policies may include:

Example I: The KickBox portal is not authorized to sell Disney movies.

Example II: A user which is located in Belgium (region 2), is not authorized to receive/view Star Wars 8, which is currently authorized for users in region 1 only.

Encryption keys referred to hereinabove may be alternatively provided by client 16 to server 10 for encrypting data prior to transmission to client 16. The keys may be preconfigured with client 16 or generated by client 16 using conventional software techniques. Furthermore, decryption keys referred to hereinabove that are sent to client 16 may be likewise preconfigured with client 16, thus obviating the need to transmit decryption keys to client 16.

Figure 3:
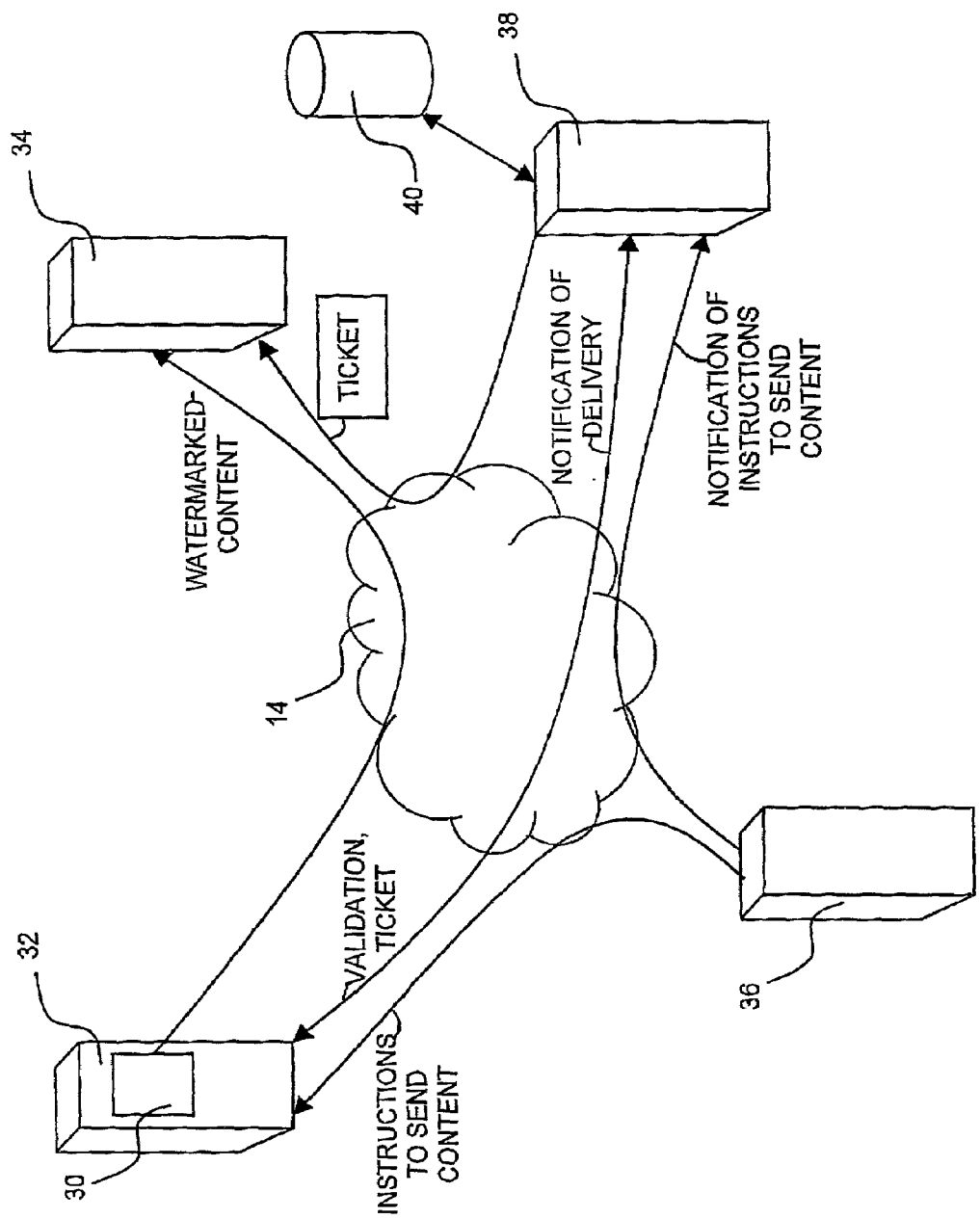
FIG. 3 is a simplified conceptual illustration of a system for preventing unauthorized transfer of data sent via computer networks, constructed and operative in accordance with another preferred embodiment of the present invention.
Figure 4:
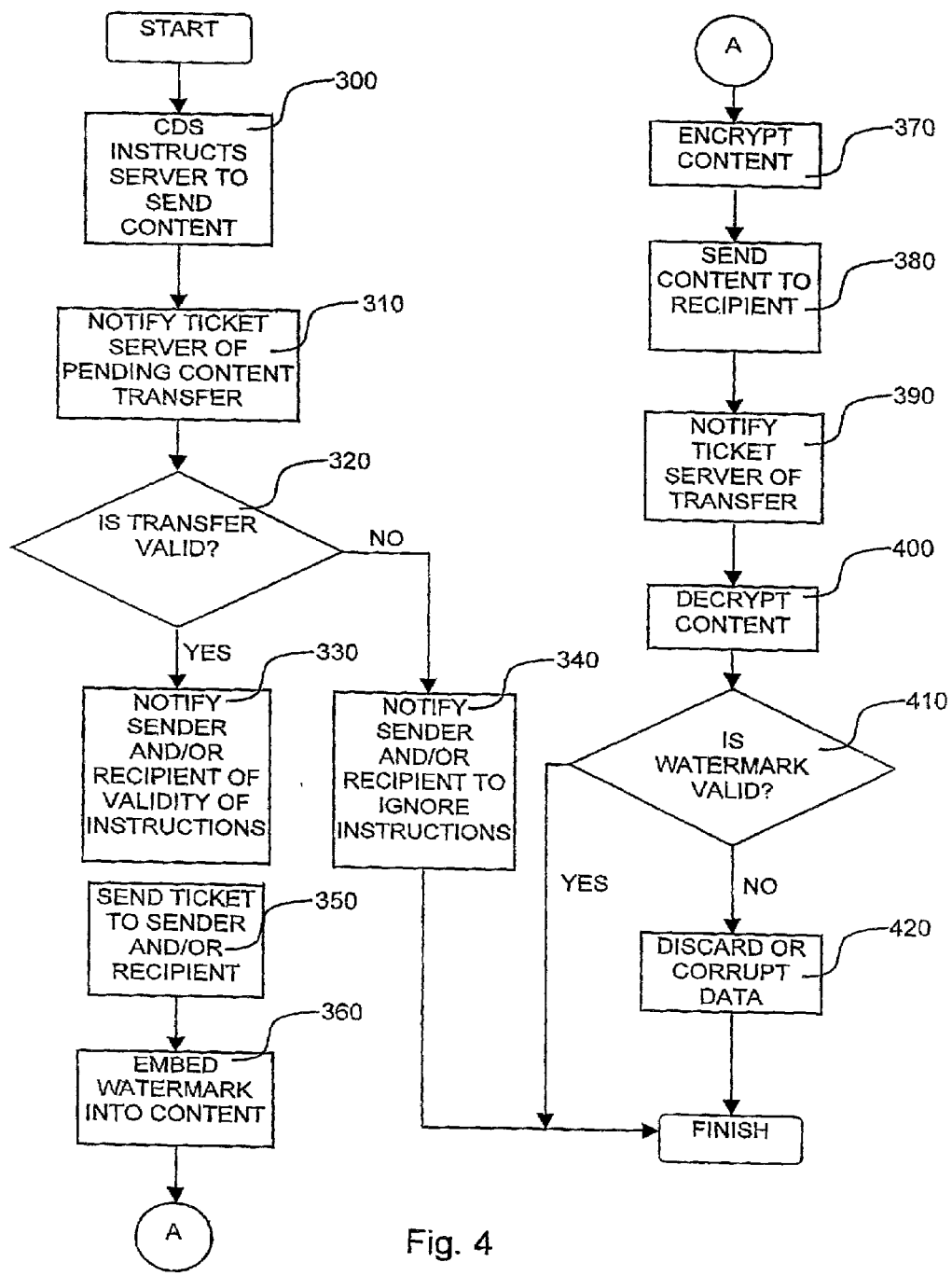
FIG. 4 is a simplified flowchart illustration of a method of operation of the system of FIG. 3, operative in accordance with a preferred embodiment of the present invention.

Reference is now made to FIG. 3, which is a simplified conceptual illustration of a system for preventing unauthorized transfer of data sent via computer networks, constructed and operative in accordance with another preferred embodiment of the present invention, and additionally to FIG. 4, which is a simplified flowchart illustration of a method of operation of the system of FIG. 3, operative in accordance with a preferred embodiment of the present invention. In the system of FIG. 3 and method of FIG. 4 authorized content 30 resides on a server 32, such as a proxy or cache server. A content delivery controller 36, such as a server, instructs server 32 to send content 30 to a server 34 (step 300). Controller 36 may be configured to determine the current network load on servers 32 and 34 using conventional load balancing techniques, instructing server 32 to send content 30 to server 34 in order to redistribute the load in accordance with predefined load balancing criteria A ticket server 38 is notified of the transfer instructions, either by server 36 or by server 32 (step 310). Ticket server 38 preferably checks the validity of the transfer parameters against a policy table 40 (step 320). Server 32 and/or server 34 are notified of the validity of the instructions by ticket server 38 (step 330), with server 32 and/or server 34 ignoring the instructions should they be proven invalid (step 340). Server 36 may also be notified of the instructions not having been carried out by server 32, 34, or 38.

Ticket server 38 may send a ticket to server 32 and/or server 34 in anticipation of the transfer of content 30 (step 350). Prior to sending content 30 to server 34, server 32 preferably embeds into content 30, using digital watermarking or other known data embedding technique, an identification unique to server 32, an identification unique to server 34, and/or other routing and/or rule-based data, such as "do not pass through a specific region" where the region is identified by routers or proxies along the way (step 360). Server 32 preferably encrypts content 30 using an encryption key that server 32 receives as part of the ticket sent to it by ticket server 38 (step 370). Server 32 then sends content 30 to server 34 (step 380) and preferably reports to ticket server 38 that content 30 was sent to server 34 (step 390).

Content 30 then arrives at server 34. If content 30 is encrypted server 34 may decrypt it, preferably with a decryption key received from ticket server 38 (step 400). Server 34 then determines that content 30 is allowed to reside on server 34 by checking the validity of content 30's embedded information (step 410). If content 30 lacks a correctly encoded digital watermark, or if the information embedded into content 30 otherwise contraindicates a valid content transfer, then content 30 is deemed to be invalid. Additionally or alternatively, server 34 may send a ticket to ticket server 38 with content 30's ID for validation. If either server 34 or ticket server 38 determine that content 30 is improperly marked or otherwise identified, server 34 discards content 30 (step 420). Server 34 and subsequent servers may similarly mark and encrypt content 30 prior to sending content 30 to another server.

The watermarking of content 30 in accordance with conventional techniques is preferably done such that if content 30 is modified, the watermark in content 30 will change. Thus, if server 34 does not identify a proper digital watermark in content 30, or if server 34 determines that the watermark has been removed, content 30 is discarded.

As an alternative to discarding unauthorized content, the content may simply be corrupted and thus rendered useless. It is appreciated that either technique may be implemented at suitable configured servers or at routers capable of being configured to perform the method of FIG. 4.

It is appreciated that content that is received from a server in accordance with the present invention may identify the particular server from which it came where the digital watermark embedded by the server is unique to that server. Thus, any attempt to store content on a server in an unauthorized fashion will result in the content being discarded or corrupted in accordance with the method of FIG. 4.

The validity of a ticket may be determined in accordance with policy table 40 including distribution parameters preferably specified by the content owner and implemented at ticket server 38. Examples of such distribution parameters may include allowing only proxies located at specific geographical regions to receive and/or supply content, as well as a list of unauthorized servers, or servers whose security has been compromised. Examples of policies may include a server which is located in Italy (region 2) is not authorized to contain Star Wars 8, which is currently authorized for region 1 servers only.

It is appreciated that functional elements of the invention described herein with respect to a specific server may be incorporated into any other of the servers mentioned herein in accordance with conventional techniques.

It is appreciated that one or more steps of any of the methods described herein may be implemented in a different order than that shown while not departing from the spirit and scope of the invention.

While the methods and apparatus disclosed herein may or may not have been described with reference to specific hardware or software, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for preventing unauthorized access by a requestor to data sent via computer networks, comprising:
    a) requesting, from a requesting computer, access to data from a first server;
    at said first server;
    b) determining if said request is a valid request;
    c) receiving a ticket from a ticket server;
    if said request is a valid request;
    d) providing said ticket identifying said requestor to a second server wherein said data is stored;

e) directing said requesting computer to request access to said data from said second server;

at said second server;

f) receiving said request from said requesting computer;

g) verifying said ticket as identifying said requestor; and h) sending said data to said requesting computer in response to said request.

2. A method according to claim 1 wherein said requesting computer is a client computer.

3. A method according to claim 1 wherein said second server is either of a proxy server and a cache server.

4. A method according to claim 1 wherein said data is encrypted and wherein said providing step d) further comprises said first server providing a decryption key to said second server for decrypting said data.

5. A method according to claim 1 wherein said data is encrypted and wherein providing step d) further comprises said ticket server providing a decryption key to said second server for decrypting said data.

6. A method according to claim 1 wherein said providing step d) further comprises providing said ticket to said second server by way of said client computer.

7. A method according to claim 6 and further comprising said client computer locating said second server using a search engine.

8. A method according to claim 1 wherein said verifying step g) further comprises:

i) sending said ticket to said ticket server for validation; and j) receiving a communication from said ticket server validating said ticket.

9. A method according to claim 1 wherein said sending step h) further comprises embedding a marking into said data prior to sending said data to said client computer.

10. A method according to claim 9 wherein said marking is a digital watermark.

11. A method according to claim 9 wherein said marking is a personalized marking for said requestor.

12. A method for preventing unauthorized transfer of data sent via computer networks, the method comprising the steps of:

instructing a first server to send content to a second server;

notifying a ticket server of said instructions;

validating said instructions at said ticket server;

if said instructions re valid;

notifying either of said servers that said instructions are valid;

sending said content from said first server to said second server;

if said instructions are invalid;

notifying either of said servers that said instructions are invalid;

performing any of:

ignoring said instructions;

corrupting said content; and discarding said content.

13. A method according to claim 12 and further comprising the steps of:

embedding a marking into said data;

checking the validity of said marking at either of said servers; and if said marking is invalid, performing any of:

ignoring said instructions;

corrupting said content; and discarding said content.

14. A method according to claim 12 wherein said validating step comprises validating said instructions in accordance with a policy.

15. A method according to claim 13 wherein said embedding step comprises embedding any of an identification unique to said first server, an identification unique to said second server, routing information, and rule-based information.

16. A method according to claim 12 and further comprising:

said first server receiving an encryption key from said ticket server; and encrypting said content using said encryption key.

17. A method according to claim 16 and further comprising:

said second server receiving a decryption key from either of said first srver and said ticket server; and decrypting said content using said decryption key.

* * * * *